United States Patent
Masuichi et al.

(10) Patent No.: US 7,461,047 B2
(45) Date of Patent: Dec. 2, 2008

(54) QUESTION ANSWERING SYSTEM, DATA SEARCH METHOD, AND COMPUTER PROGRAM

(75) Inventors: Hiroshi Masuichi, Kanagawa (JP);
Daigo Sugihara, Kanagawa (JP);
Tomoko Ohkuma, Kanagawa (JP);
Hiroki Yoshimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 440 days.

(21) Appl. No.: 11/231,947

(22) Filed: Sep. 22, 2005

(65) Prior Publication Data
US 2006/0206472 A1 Sep. 14, 2006

(30) Foreign Application Priority Data
Mar. 14, 2005 (JP) .............................. 2005-070540

(51) Int. Cl.
*G06F 15/00* (2006.01)
*G06F 15/18* (2006.01)

(52) U.S. Cl. ...................................................... 706/62
(58) Field of Classification Search ....................... None
See application file for complete search history.

(56) References Cited

U.S. PATENT DOCUMENTS

| | | | | |
|---|---|---|---|---|
| 6,816,858 B1 * | 11/2004 | Coden et al. | .................... | 707/5 |
| 6,820,075 B2 * | 11/2004 | Shanahan et al. | .............. | 707/3 |
| 6,850,949 B2 * | 2/2005 | Warner et al. | ................ | 707/101 |
| 6,859,800 B1 * | 2/2005 | Roche et al. | .................... | 707/3 |
| 6,865,370 B2 * | 3/2005 | Ho et al. | ..................... | 434/362 |
| 6,928,425 B2 * | 8/2005 | Grefenstette et al. | ............ | 707/2 |
| 7,031,951 B2 * | 4/2006 | Mancisidor et al. | ............ | 706/60 |
| 7,058,564 B2 * | 6/2006 | Ejerhed | ........................ | 704/1 |
| 7,117,432 B1 * | 10/2006 | Shanahan et al. | ............ | 715/210 |

(Continued)

FOREIGN PATENT DOCUMENTS

JP A 2002/132811 5/2002

OTHER PUBLICATIONS

Performance analysis of a distributed question/answering system Surdeanu, M.; Moldovan, D.I.; Harabagiu, S.M.; Parallel and Distributed Systems, IEEE Transactions on vol. 13, Issue 6, Jun. 2002 pp. 579-596 Digital Object Identifier 10.1109/TPDS.2002.1011413.*

(Continued)

*Primary Examiner*—Michael B Holmes
(74) *Attorney, Agent, or Firm*—Oliff & Berridge, PLC

(57) ABSTRACT

A question answering system includes a similar-question generation unit, a first search unit, a second search unit, and an answer selection unit. The similar-question generation unit selects a feature word from an input question to generate a transformational question in which the feature word is replaced with another word. The first search unit executes a first search process based on the transformational question. The second search unit selects a word included in a first search result acquired as an extension word and executes a second search process with using the selected extension word. The answer selection unit analyzes a correspondence relation among extension words included in a second search result, determines the feature word and a constructive part of an answer equivalent word in the second search result based on an analysis result, and selects a word determined to be an answer.

17 Claims, 9 Drawing Sheets

U.S. PATENT DOCUMENTS

| | | | | |
|---|---|---|---|---|
| 7,120,574 B2* | 10/2006 | Troyanova et al. | ............. | 704/9 |
| 7,120,627 B1* | 10/2006 | Schabes et al. | ................ | 707/3 |
| 7,133,862 B2* | 11/2006 | Hubert et al. | .................. | 707/3 |
| 7,149,732 B2* | 12/2006 | Wen et al. | ....................... | 707/4 |
| 7,152,057 B2* | 12/2006 | Brill et al. | ....................... | 707/2 |
| 7,177,789 B1* | 2/2007 | Hsu et al. | ....................... | 704/9 |
| 7,209,923 B1* | 4/2007 | Cooper | ....................... | 707/100 |
| 7,236,968 B2* | 6/2007 | Seki et al. | ....................... | 707/1 |
| 7,269,545 B2* | 9/2007 | Agichtein et al. | ............. | 704/9 |
| 7,299,228 B2* | 11/2007 | Cao et al. | ....................... | 707/6 |
| 7,359,896 B2* | 4/2008 | Torigoe et al. | ................. | 707/4 |
| 7,373,300 B1* | 5/2008 | Bangalore et al. | ........ | 704/270.1 |
| 7,376,634 B2* | 5/2008 | Liu et al. | ....................... | 706/61 |
| 7,384,191 B2* | 6/2008 | Dimmick et al. | ............ | 374/137 |
| 7,409,335 B1* | 8/2008 | Horvitz et al. | ................. | 704/9 |
| 7,412,093 B2* | 8/2008 | Chung et al. | ................ | 382/181 |
| 7,412,385 B2* | 8/2008 | Brockett et al. | ............. | 704/245 |
| 2003/0158723 A1 | 8/2003 | Masuichi et al. | | |
| 2006/0204945 A1 | 9/2006 | Masuichi et al. | | |
| 2006/0206481 A1 | 9/2006 | Ohkuma et al. | | |

OTHER PUBLICATIONS

Question answering on the semantic Web McGuinness, D.L.; Intelligent Systems, IEEE vol. 19, Issue 1, Jan.-Feb. 2004 pp. 82-85 Digital Object Identifier 10.1109/MIS.2004.1265890.*

Question answering system based on Ontology Qinglin Guo,; Intelligent Control and Automation, 2008. WCICA 2008. 7th World Congress on Jun. 25-27, 2008 pp. 3347-3352 Digital Object Identifier 10.1109/WCICA.2008.4593456.*

Lexical validation of answers in Question Answering Ligozat, Anne-Laure; Grau, Brigitte; Vilnat, Anne; Robba, Isabelle; Grappy, Digital Object Identifier 10.1109/WI.2007.97.*

User-centered evaluation of question answering systems Chorng-Shyong Ong,; Min-Yuh Day,; Kuo-Tay Chen,; Wen-Liar Hsu,; Intelligence and Security Informatics, 2008. ISI 2008. IEEE International Conference on Jun. 17-20, 2008 pp. 286-287 Digital Object Identifier 10.1109/ISI.2008.4565087.*

A Knowledge-Based Question Answering System for B2C eCommerce Tapeh, A.G.; Rahgozar, M.; Information Technology: New Generations, 2008. ITNG 2008. Fifth International Conference on Apr. 7-9, 2008 pp. 321-326 Digital Object Identifier 10.1109/ITNG.2008.26.*

A Question Answering System for the Operation of Software Applications Fujii, A.; Takegata, S.; Advanced Information Networking and Applications—Workshops, 2008. AINAW 2008. 22nd International Conference on Mar. 25-28, 2008 pp. 1169-1174 Digital Object Identifier 10.1109/WAINA.2008.127.*

Question Similarity Calculation for FAQ Answering Wanpeng Song; Min Feng; Naijie Gu; Liu Wenyin; Semantics, Knowledge and Grid, Third International Conference on Oct. 29-31, 2007 pp. 298-301 Digital Object Identifier 10.1109/SKG.2007.32.*

Restricted-domain Chinese automatic question-answering system based on question sentence similarity Zheng-Tao Yu; Xiao-Zhong Fan; Peng-Cheng Ji; Machine Learning and Cybernetics, 2004. Proceedings of 2004 International Conference on vol. 5, Aug. 26-29, 2004 pp. 3023-3028 vol. 5 Digital Object Identifier 10.1109/ICMLC.2004.1378551.*

Jimmy Lin et al., "Question Answering Techniques for the World Wide Web," Tuturial Presentation at The 11th Conference of the European Chapter of the Association of Computational Linguistics, Apr. 12, 2003.

Boris Katz et al., "Omnibase: Uniform Access to Heterogeneous Data for Question Answering," Artificial Intelligence Laboratory, 2002.

Hiroshi Masuichi et al., "Constructing a practical Japanese Parser based on Lexical Functional Grammar," vol. 10, No. 2, pp. 79-109, 2003.

Hiroshi Masuichi et al., "Japanese Parser on the basis of the Lexical-Functional Grammar Formalism and its Evaluation," Pacific Asia Conference on Language, Information and Computation (PACLIC17), pp. 298-309, 2003.

Martin Kay, "Chart Generation," 34th Annual Meeting of the Association for Computational Linguistics, pp. 200-204, 1996.

* cited by examiner

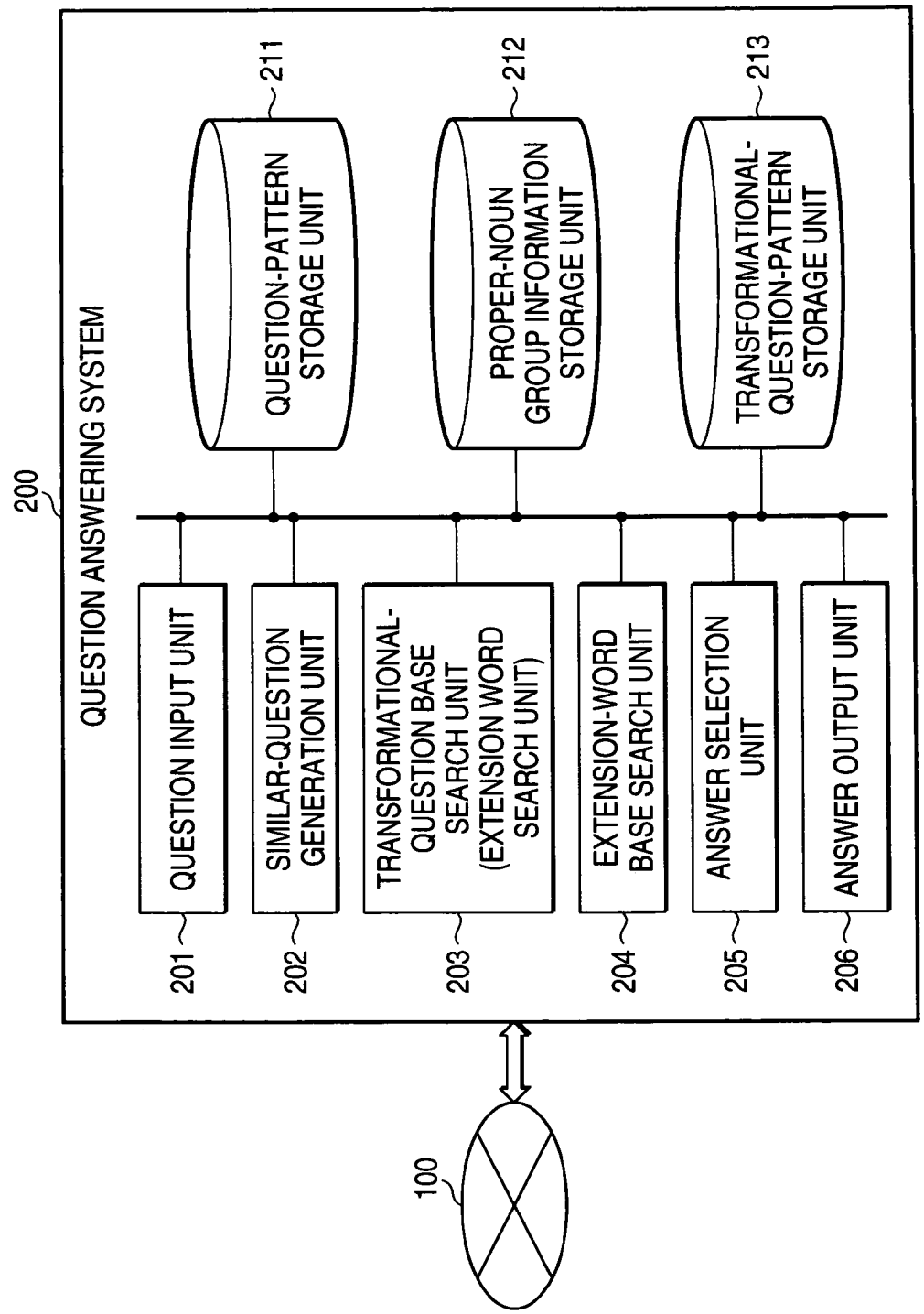

FIG. 3

The Highest Mountain In Each Prefecture

| Prefecture | Name of Mountain | Place | Height | LAT | LNG | Map |
|---|---|---|---|---|---|---|
| Hokkaido | Mt. Taisetsuzan | Ishikari Mountain Range | 2,290 | 43 39 40 | 142 51 29 | Mt. Asahidake |
| Aomori | Mt. Iwakisan | Shirakami Mountain Range | 1,625 | 40 39 12 | 140 18 24 | Mt. Iwakisan |
| Iwate | Mt. Iwatesan | Northern Area of Ou Mountains | 2,038 | 39 50 59 | 141 00 16 | Obuke |
| Miyagi | Mt. Zaosan | Southern Area of Ou Mountains | 1,841 | 38 08 26 | 140 26 36 | Mt. Zaosan |
| Akita | Mt. Chokaisan | Dewa Mountain Range | 1,757 | 39 05 47 | 140 04 07 | Mt. Chokaisan |
| Yamagata | Mt. Chokaisan | Dewa Mountain Range | 2,236 | 39 05 47 | 140 03 08 | Mt. Chokaisan |
| ... | ... | ... | ... | ... | ... | ... |
| ... | ... | ... | ... | ... | ... | ... |
| Kumamoto | Mt. Kunimidake | Kyushu Mountain Range | 1,739 | 32 32 37 | 131 01 15 | Mt. Kunimidake |
| Oita | Mt. Kokonoeyama | Aso/Kuzumi | 1,787 | 33 04 44 | 131 14 36 | Mt. Kuzumisan |
| Miyazaki | Mt. Sobosan | Kyushu Mountain Range | 1,756 | 32 49 29 | 131 20 58 | Mt. Sobosan |
| Kagoshima | Mt. Miyanouradake | Okuma Island Chain | 1,935 | 30 19 57 | 130 30 23 | Mt. Miyanouradake |
| Okinawa | Mt. Omotodake | Ishigakijima Island | 526 | 24 25 18 | 124 10 59 | Kabira |

FIG. 4

```
<p><div align="center">
<table align="center" width="750" height="40" bgcolor="#008000"><tr>
<td align="center"><font size="4" color="yellow">THE HIGHEST MOUNTAIN IN EACH PREFECTURE</font></td></tr>
</table>
<table align="center" border="1" height="40">
<tr><td bgcolor="#008000" align="center"><font size="3" color="white">PREFECTURE</font></td>
<td bgcolor="#008000" align="center"><font size="3" color="white">NAME OF MOUNTAIN</font></td>
<td bgcolor="#008000" align="center"><font size="3" color="white">PLACE</font></td>
<td bgcolor="#008000" align="center"><font size="3" color="white">HEIGHT</font></td>
<td bgcolor="#008000" align="center"><font size="3" color="white">LAT</font></td>
<td bgcolor="#008000" align="center"><font size="3" color="white">LNG</font></td>
<td bgcolor="#008000" align="center"><font size="3" color="white">MAP</font></td>
<tr><td>Hokkaido</td><td>Mt. Tiasetsuzan</td><td>Ishikari Mountain Range</td><td>2,290</td><td>43 39 40</td><td>142 51 29</td><td>Mt. Asahidake</td></tr>
<tr><td>Aomori</td><td>Mt. Iwakisan</td><td>Shirakami Mountain Range</td><td>1,625</td><td>40 39 12</td><td>140 18 24</td><td>Mt. Iwakisan</td></tr>
<tr><td>Iwate</td><td>Mt. Iwatesan</td><td>Northern Area of Ou Mountains</td><td>2,038</td><td>39 50 59</td><td>141 00 16</td><td>Mt. Obuke</td></tr>
<tr><td>Miyagi</td><td>Mt. Zaosan</td><td>Southern Area of Ou Mountains</td><td>1,841</td><td>38 08 26</td><td>140 26 36</td><td>Mt. Zaosan</td></tr>
<tr><td>Akita</td><td>Mt. Choukaisan</td><td>Dewa Mountain Range</td><td>1,757</td><td>39 05 47</td><td>140 04 07</td><td>Mt. Choukaisan</td></tr>
<tr><td>Yamagata</td><td>Mt. Choukaisan</td><td>Dewa Mountain Range</td><td>2,236</td><td>39 05 47</td><td>140 03 08</td><td>Mt. Choukaisan</td></tr>
<tr><td> ... </td><td> ... </td><td> ... </td><td> ... </td><td> ... </td><td> ... </td><td> ... </td></tr>
<tr><td> ... </td><td> ... </td><td> ... </td><td> ... </td><td> ... </td><td> ... </td><td> ... </td></tr>
<tr><td>Kumamoto</td><td>Mt. Kunimidake</td><td>Kyushu Mountain Range</td><td>1,739</td><td>32 32 37</td><td>131 01 15</td><td>Mt. Kunimidake</td></tr>
<tr><td>Oita</td><td>Mt. Kokonoeyama</td><td>Aso/Kuzumi</td><td>1,787</td><td>33 04 44</td><td>131 14 6</td><td>Mt. Kuzumisan</td></tr>
<tr><td>Miyazaki</td><td>Mt. Sobosan</td><td>Kyushu Mountain Range</td><td>1,756</td><td>32 49 29</td><td>131 20 58</td><td>Mt. Sobosan</td></tr>
<tr><td>Kagoshima</td><td>Mt. Miyanouradake</td><td>Okuma Island Chain</td><td>1,935</td><td>30 19 57</td><td>130 30 23</td><td>Mt. Miyanouradake</td></tr>
<tr><td>Okinawa</td><td>Mt. Omotodake</td><td>Ishigakijima Island</td><td>526</td><td>24 25 18</td><td>124 10 59</td><td>Kabira</td></tr>
</tr>
</table>
</div>
</p>
```

FIG. 7A

| MODIFIER | MODIFIEE | MODIFICATION RELATION |
|---|---|---|
| OKINAWA | MOUNTAIN | ADJUNCT |
| THE HIGHEST | MOUNTAIN | ADJUNCT |
| MOUNTAIN | COPULA | SUBJECT |
| INTERROGATIVE PRONOUN | COPULA | COMPLEMENT |

FIG. 7B

| MODIFIER | MODIFIEE | MODIFICATION RELATION |
|---|---|---|
| *1 (PROPER NOUN) | *2 | ADJUNCT |
| *2 | COPULA | SUBJECT |
| INTERROGATIVE PRONOUN | COPULA | COMPLEMENT |

QUESTION ANSWERING SYSTEM, DATA SEARCH METHOD, AND COMPUTER PROGRAM

BACKGROUND OF THE INVENTION

1. Field of the Invention

This invention relates to a question answering system, a data search method, and a computer program, and more particularly to a question answering system, a data search method, and a computer program for making it possible to efficiently provide a highly accurate answer in a system in which a user enters a question sentence and an answer to the question is provided.

2. Description of the Related Art

Recently, network communications through the Internet, etc., have grown in use and various services have been provided through the network. One of the services through the network is search service. In the search service, for example, a search server receives a search request from a user terminal such as a personal computer or a mobile terminal connected to the network, executes a process responsive to the search request, and transmits the process result to the user terminal.

For example, to execute a search process through the Internet, a user accesses a Web site providing search service, enters search conditions such as a keyword, a category, etc., in accordance with a menu presented by the Web site, and transmits the search conditions to a server. The server executes a process in accordance with the search conditions and displays the process result on the user terminal.

A data search process is implemented by various modes. For example, a keyword-based search system in which the user enters a keyword and list information of documents containing the entered keyword is presented to the user; a question answering system in which the user enters a question sentence and an answer to the question is provided; and the like are available. The question answering system is a system in which the user needn't select a keyword and can receive only the answer to the question; it is widely used.

For example, JP 2002-132811 A discloses a typical question answering system. JP 2002-132811 A discloses a configuration for determining a search-word set and a question type from a question sentence, searching a document set stored in a document-set storage unit for a relevant-document set in accordance with the determined search-word set and the question type, extracting an answer to the question sentence from relevant documents, and providing the extracted answer and document information from which the answer is extracted as an answering result to the question sentence.

In a general question answering system, the question sentence provided by the user is input and the answer to the question sentence is output without outputting the whole hit document. Often, web information is used as a knowledge source to obtain an answer. Under the present circumstances, however, it is difficult to say that the question answering system has sufficient answering accuracy, and the question answering system is less widespread than a general keyword-based search system.

On the other hand, it is known that typical question patterns exist in the question answering system. For example, the typical question patterns include the followings:

When was {Ieyasu TOKUGAWA} born?
{Where} is {the capital} of {Congo}?
{Where} is {Taj Mahal}?

It is noted that Ieyasu TOKUGAWA was the founder of the Tokugawa bakufu of Japan, which ruled from 1600 to 1868, and that Ieyasu was the first shogun of the Tokugawa bakufu.

In the questions, if the word enclosed in { } is replaced with another word, various questions of the same question pattern are generated. For example, "When was {Ieyasu TOKUGAWA|Yoritomo MINAMOTO|Genpaku SUGITA} born?"

"{Where|how many people|who} is {the capital|Population|prime minister} of {congo|Estonia|Latvia}?"

"{Where} is {Taj Mahal|Angkor Wat|opera house}?"

In these questions, {a|b|c} represents that a, b and c can be replaced with each other. It is noted that Yoritomo MINAMOTO and Genpaku SUGITA are the names of Japanese historical persons.

Thus, it is known that there is an empirical rule (Zipf rule) that questions presented by the users in the question answering system are classified into a small number of typical question patterns and such typical question patterns cover most of the whole questions. This is described in detail in "Question Answering Techniques for the World Wide Web," (Jimmy Lin and Boris Katz, Tutorial presentation at The 11th Conference of Computational Linguistics (2003)).

"Omnibase: Uniform access to heterogeneous data for question answering" (Boris Katz, Sue Felshin, Deniz Yuret, Ali Ibrahim, Jimmy Lin, Gregory Marton, Alton Jerome McFarland, and Baris Temelkuran, In Proceedings of the 7th International Workshop on Applications of Natural Language to Information Systems (2002)) has proposed a technique of manually providing "set of typical question pattern and Web page comprehensively containing an answer to the question" and dramatically improving the answering accuracy to the question matching the question pattern. For example, a Web page having a list of country names and capitals is previously specified for a question pattern of "Where is the capital of [country name]?" such as Where is the capital of USA?
Where is the capital of England?

If a question matching the question pattern is input to the system, the list is referenced and the capital corresponding to the specified country name is output as an answer, whereby it is made possible to efficiently return the error-free answer.

However, the above-described technique, namely, the process of manually providing the set of typical question pattern and Web page comprehensively containing the answer to the question requires that the Web page comprehensively containing the answer to the typical question pattern be previously specified, and enormous man-hours are needed; this is a problem. Further, the maintenance cost to deal with disuse, drastic content change, or URL change of the Web page becomes extremely high; this is also a problem.

SUMMARY OF THE INVENTION

The invention provides a question answering system, a data search method, and a computer program for making it possible to automatically efficiently select a Web page containing an answer to a typical question pattern and further provide a highly accurate answer without making any erroneous answer if disuse, content change, URL change, etc., of a Web page occurs.

According to one embodiment of the invention, a question answering system includes a similar-question generation unit, a first search unit, a second search unit, and an answer selection unit. The similar-question generation unit selects a feature word from an input question to generate a transformational question in which the feature word is replaced with another word. The first search unit executes a first search process based on the transformational question generated by the similar-question generation unit. The second search unit selects a word included in a first search result acquired by executing the first search process as an extension word and executes a second search process with using the selected extension word. The answer selection unit that analyzes a correspondence relation among extension words included in a second search result acquired by executing the second search process, determines the feature word and a constructive part of an answer equivalent word in the second search result based on an analysis result, and selects a word determined to be an answer.

According to another embodiment of the invention, a data search method includes selecting a feature word from an input question; generating a transformational question in which the feature word is replaced with another word; executing a first search process based on the transformational question generated; selecting a word included in a first search result acquired by executing the first search process as an extension word; executing a second search process with using the selected extension word; analyzing a correspondence relation among extension words included in a second search result acquired by executing the second search process; determining the feature word and a constructive part of an answer equivalent word in the second search result based on an analysis result; and selecting a word determined to be an answer.

According to still another embodiment of the invention, a computer program stored in a computer readable medium. The computer program causes a computer to execute a data search process including: selecting a feature word from an input question; generating a transformational question in which the feature word is replaced with another word; executing a first search process based on the transformational question generated; selecting a word included in a first search result acquired by executing the first search process as an extension word; executing a second search process with using the selected extension word; analyzing a correspondence relation among extension words included in a second search result acquired by executing the second search process; determining the feature word and a constructive part of an answer equivalent word in the second search result based on an analysis result; and selecting a word determined to be an answer.

The computer program is one that can be provided by a storage medium or a communication medium or a communication medium that provide the computer program in a computer-readable format to a computer system that can execute various program codes. Examples of the storage medium include CD, FD, and MO. Examples of the communication medium include a network. By providing such a program in the computer-readable format, a process responsive to the program is realized on a computer system.

Another object of the invention, features of the invention, and advantages of the invention will be revealed in the detailed description based on embodiments of the invention and the accompanying drawings. The system in the specification is a logical set made up of a plurality of units (apparatus) and is not limited to a set of units (apparatus) housed in a single casing.

According to the above-described configuration, if an answer to the input question cannot be detected in the search process, it is possible to acquire an answer to the input question at a high probability with using a question based on a similar question.

BRIEF DESCRIPTION OF THE DRAWINGS

Embodiment of the invention will be described in detail based on the following figures, wherein:

FIG. 2 is a block diagram to describe the configuration of the question answering system according to one embodiment of the invention;

FIG. 3 is a drawing showing a Web page example as the search result acquired in the question answering system according to the embodiment of the invention;

FIG. 4 is a drawing showing HTML data of the Web page shown in FIG. 3;

FIG. 7 is a drawing to describe data of the syntactic and semantic analysis result and a question pattern;

DETAILED DESCRIPTION OF THE EMBODIMENTS

A question answering system, a data search method, and a computer program according to an embodiment of the invention will be discussed in detail with reference to the accompanying drawings.

Figure 1:
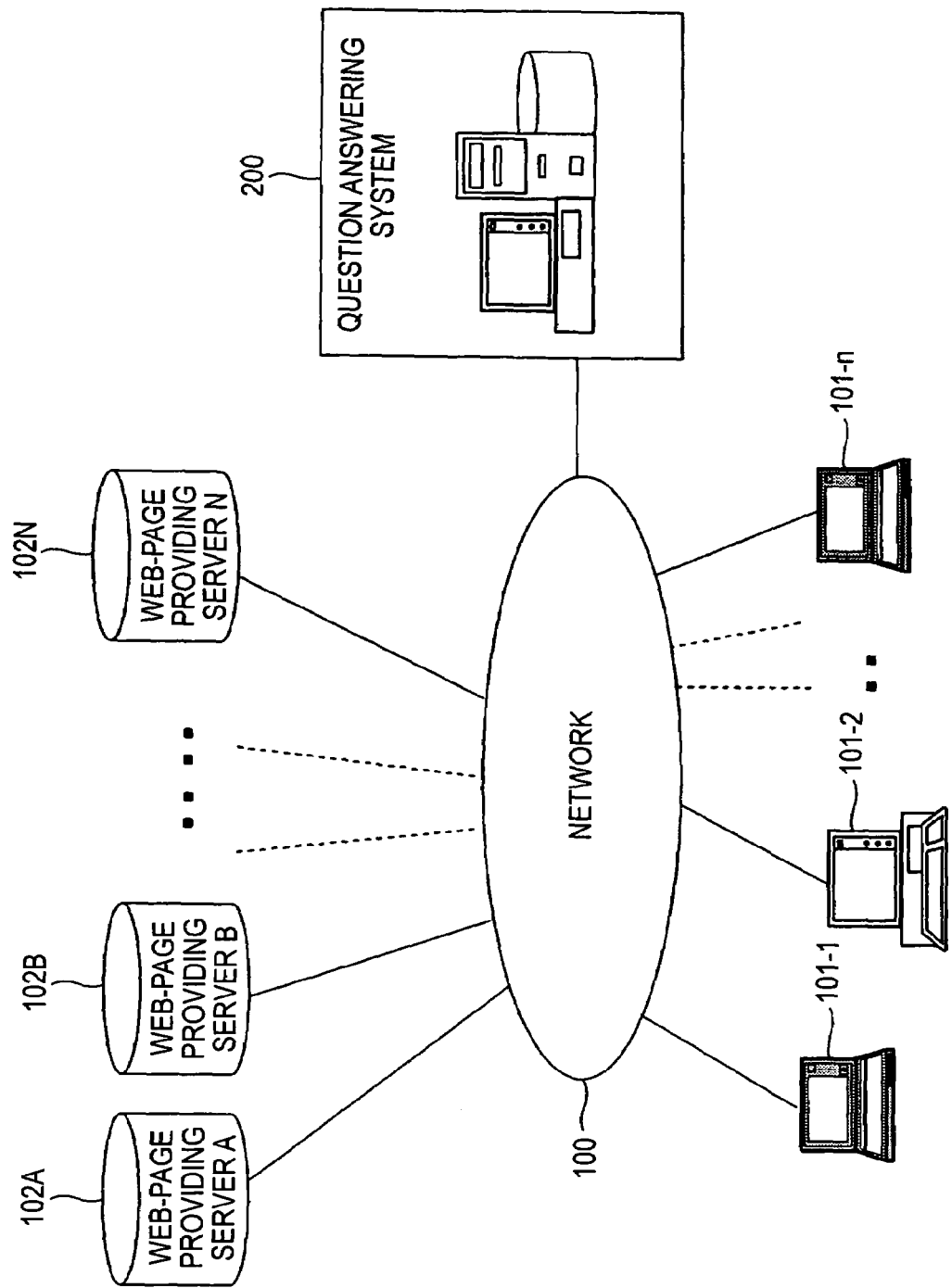
FIG. 1 is a drawing of the network configuration to show an application example of a question answering system of the invention.

To begin with, an example of the usage pattern of the question answering system of the embodiment of the invention will be discussed with reference to FIG. 1. FIG. 1 is a drawing showing the network configuration in which a question answering system 200 of the embodiment of the invention is connected to a network. A network 100 shown in FIG. 1 is, for example, the Internet, an intranet, etc. Connected to the network 100 are clients 101-1 to 101-n serving as user terminals for transmitting a question to the question answering system 200 and various Web-page providing servers 102A to 102N for providing Web pages serving as materials to acquire answers to the clients 101-1 to 101-n.

The question answering system 200 is input various question sentences generated by the users from the clients 101-1 to 101-n and provides the answers to the input questions for the clients 101-1 to 101-n. The answers to the questions are acquired from the Web pages provided by the Web-page providing servers 102A to 102N.

The Web-page providing servers 102A to 102N provide Web pages as pages opened to the public by a WWW (World Wide Web) system. The Web page is a data set to be displayed on a Web browser and is made up of text data, HTML layout information, an image, audio, a moving image, etc., embedded in a document. A set of Web pages is a Web site, which includes a top page (home page) and other Web pages linked from the top page.

The configuration and process of the question answering system 200 will be discussed with reference to FIG. 2. The question answering system 200 is connected to the network 100 and executes process of receiving an answer from a client connected to the network 100, searching for an answer the Web pages provided by the Web-page providing server connected to the network 100 as the information source, and providing the answer for the client.

The question answering system 200 has a question input unit 201, a similar-question generation unit 202, a transformational-question base search unit 203 (serving as a first search unit), an extension-word base search unit 204 (a second search unit), an answer selection unit 205, an answer output unit 206, a question-pattern storage unit 211, a proper-noun group information storage unit 212 (serving as a first storage unit), and a transformational-question-pattern storage unit 213, as shown in FIG. 2.

First, data that the question answering system 200 has, namely, data stored in the question-pattern storage unit 211, the proper-noun group information storage unit 212, and the transformational-question-pattern storage unit 213 will be discussed.

[Question-pattern Storage Unit]

The question-pattern storage unit 211 stores typical question patterns for surface character strings in constructive sentences of questions. It is known that typical patterns exist in questions received from the clients (input questions), as described above. For example, When was {TOKUGAWA Ieyasu} born?
{Where} is {the capital} of {Congo}?
{Where} is {Taj Mahal}?

and the like are the typical question patterns. In these questions, if the word enclosed in { } is replaced with another word, various questions of the same question pattern are generated. For example, "When was {Ieyasu TOKUGAWA|Yoritomo MINAMOTO|Genpaku SUGITA} born?"
"{Where|how many people|who} is {the capital|population|prime minister} of {Congo|Estonia|Latvia}?"
"{Where} is {Taj Mahal|Angkor Wat|opera house}?"

In these questions, {a | b | c} represents that a, b and c can be replaced with each other.

Thus, it is known that there is an empirical rule (Zipf rule) that the questions presented by the users in the question answering system are classified into a small number of typical question patterns and that such typical question patterns cover most of the whole questions.

The question-pattern storage unit 211 stores typical question patterns for surface character strings in constructive sentences of questions. For example, (Question Pattern 1)
"{Where|When|What|How much} is [*2] in [*1]?"
(Question pattern 2)
"{What|Where} did [*1] [*2 (verb in the canonical form)]?"

The question-pattern storage unit 211 stores such typical question patterns for the surface character strings in the constructive sentences. In the question patterns, [*1] and [*2] basically indicate any desired character strings. [*1] is a proper noun, and such a proper noun is called "feature word".

[Proper-noun Group Information Storage Unit]

The proper-noun group information storage unit 212 stores group information of proper nouns. For example, (Japanese) Prefecture name group: Tokyo, Osaka, Hokkaido, . . . , Fukushima, . . . , Kagoshima, Okinawa
Country name group: Japan, USA, England . . .

Further, a group of proper nouns that can be replaced with the proper noun (feature word) specified in the question received from each client, such as planet names, company names in the same field, or commodity names of the same company, is stored as the group information of the proper noun.

[Transformational-question-Pattern Storage Unit]

The transformational-question-pattern storage unit 213 stores a transformational pattern, which is applied to transform the question pattern stored in the question-pattern storage unit 211, for each question pattern. For example, assuming that the question patterns stored in the question-pattern storage unit 211 are the question patterns described above, namely, (Question pattern 1)
"{Where|When|What|How much} is [*2] in [*1]?"
(Question pattern 2)
"{What|Where} did [*1] [*2 (verb in the canonical form)]?"

If the question-pattern storage unit 211 stores such question patterns, the transformational-question-pattern storage unit 213 stores the transformational patterns corresponding to question patterns 1 and 2. In the questions, {a|b|c} represents that a, b and c can be replaced with each other.

Specifically, the transformational-question-pattern storage unit 213 stores (Transformational Question Pattern 1)
"[*2] in [*1'] is [*3]"
(Transformational Question Pattern 2)
"[*1'] [*2 (verb in the past tense)] [*3]"

[*3] shown in (Transformational question pattern 1) indicates any desired character string and is located at a position where the word corresponding to the answer to the input question is set, namely, is a constructive part of an answer equivalent word.

Next, process executed by the question input unit 201, the similar-question generation unit 202, the transformational-question base search unit (serving as the first search unit) 203, the extension-word base search unit 204, the answer selection unit 205, and the answer output unit 206 in the question answering system 200 will be discussed.

[Question Input Unit]

The question input unit 201 inputs a question sentence (input question) from a client through the network 100. Assuming that the following question (Input Question)
"What is the highest mountain in Okinawa?"

is input from a client as a specific question example, the process of each unit in the question answering system 200 will be discussed.

[Similar-question Generation Unit]

The similar-question generation unit 202 transforms the input question and generates a question sentence similar to the input question, namely, a transformational question pattern. First, the similar-question generation unit 202 executes a morphological analysis on the input question sentence to determine a question pattern matching the input question sentence among the question patterns stored in the question-pattern storage unit 211.

If the input question from the client is
(Input Question)
"What is the highest mountain in Okinawa?", it is determined that this question corresponds to (Question pattern 1) of the question patterns stored in the question-pattern storage unit 211, namely, (Question Pattern 1)

"{Where|When|What|How much} is [*2] in [*1]?"

Since [*1] in (Question pattern 1) is associated with "Okinawa" in (input question) and [*2] in (Question pattern 1) is associated with "the highest mountain" in (input question), it is determined that the input question corresponds to question pattern 1.

Next, the similar-question generation unit 202 transforms the question with using [*1] in (Question pattern 1), namely, using proper noun, which is feature word, in (input question) as [*1'], and generates (transformational question pattern 1).

In the embodiment, since [*1] in (input question) is "Okinawa" and [*2] in (input question) is "the highest mountain", the transformational question pattern 1 corresponding to the (input question) "What is the highest mountain in Okinawa?" is generated as (Transformational Question Pattern 1)

"The highest mountain in Okinawa is [*3]."

Thus, the similar-question generation unit 202 first executes:

(a) process of selecting the question pattern corresponding to the input question from among the question patterns stored in the question-pattern storage unit 211; and (b) process of applying one of the transformational question patterns stored in the transformational-question-pattern storage unit 213 based on the selected question pattern to generate (transformational question pattern 1), thereby generating (transformational question pattern 1).

The transformational-question base search unit (serving as the first search unit) 203 makes a search with using (transformational question pattern 1) obtained by executing the transformational-question-pattern generation process. For example, the transformational-question base search unit 203 searches the Web pages provided by the Web-page providing server connected to the network; for example, executes a search process based on text matching.

The transformational-question base search unit (serving as the first search unit) 203 searches text on WWW using (transformational question pattern 1) generated by the similar-question generation unit 202. If matched text exists, the transformational-question base search unit (serving as the first search unit) 203 outputs the character string corresponding to [*3] in (transformational question pattern 1) as an answer to the client through the answer output unit 206, and terminates the process.

(Transformational Question Pattern 1)

"The highest mountain in Okinawa is [*3]"

and the character string corresponding to [*3] in (transformational question pattern 1) is the character string located at the position where the word corresponding to the answer to the input question is set, namely, the character string in the constructive part of he answer equivalent word. Therefore, the character string corresponding to [*3] in (transformational question pattern 1) is output to the client through the answer output unit 206 as the answer to the (input question) as it is, and the process is terminated.

However, if the appropriate search result cannot be obtained in the search process to which (transformational question pattern 1) is applied, the similar-question generation unit 202 extracts proper noun [*'] belonging to the same group as a word, which makes up the (input question) and corresponds to the word [*1'] selected as the proper noun (feature word) in previously selected (question pattern 1), from the proper-noun group information storage unit 212.

The proper-noun group information storage unit 212 stores as proper noun group information, a group of proper nouns that can be replaced with the proper noun (feature word) specified in the question as described above The word making up the (input question) corresponding to the word [*1'] selected as the proper noun (feature word) in (question pattern 1)="Okinawa" belongs to the prefecture name group. Therefore, in this case, the proper nouns [*1'] belonging to the same group as "Okinawa" include any other (Japanese) prefecture name such as "Kumamoto," "Tokyo," or "Hokkaido."

The similar-question generation unit 202 replaces the proper noun (feature word) in previously generated (transformational question pattern 1) with the proper noun [*1'] belonging to the same group, and generates (transformational question pattern 2). (Transformational question pattern 2) generated by the similar-question generation unit 202 are shown below:

(Transformational question pattern 2-1)

"The highest mountain in Kumamoto is [*3]."

(Transformational question pattern 2-2)

"The highest mountain in Tokyo is [*3]."

(Transformational question pattern 2-3)

"The highest mountain in Hokkaido is [*3]."

The transformational-question base search unit (serving as the first search unit) 203 makes a search in sequence with using (transformational question patterns 2-1 to 2-3) obtained by performing the transformational-question-pattern generation process. The transformational-question base search unit 203 searches the Web pages provided by the Web-page providing server connected to the network; for example, executes a search process based on text matching. When the search results the number of which is equal to or larger than a predetermined threshold value (T) are obtained, generating new (transformational question pattern 2-n) and searching for an extension word are terminated.

For example, assuming that threshold value (T)=10, if 10 search results are obtained by searching with (transformational question pattern 2-1) to (transformational question pattern 2-30), generating new (transformational question pattern 2-31) and searching with the new transformational question patterns 2 are stopped. Then, a transition is made to an extension-word base search process. The extension-word base search process is described later.

Thus, the similar-question generation unit 202 performs (a) the process of selecting the question pattern corresponding to the input question from among the question patterns stored in the question-pattern storage unit 211; and (b) the process of applying one of the transformational question patterns stored in the transformational-question-pattern storage unit 213 based on the selected question pattern to generate (transformational question pattern 1), thereby generating (transformational question pattern 1). Then, the transformational-question base search unit 203 executes the search process based on the generated (transformational question pattern 1). If the appropriate search result can be obtained in the search process, a new transformational question pattern 2 is not generated. However, if the appropriate search result cannot be obtained, the similar-question generation unit 202 executes (c) process of extracting proper noun [*1'] belonging to the same group as a word, which makes up the (input question) and corresponds to the word [*1'] selected as the proper noun (feature word) in previously selected (question pattern 1), from the proper-noun group information storage unit 212; and replacing the proper noun (feature word) in (transformational question pattern 1) with the proper noun [*1'] belonging to the same group to generate (transformational question patterns 2-1 to 2-n).

The similar-question generation unit 202 executes these processes (a) to (c).

[Transformational-question Base Search Unit (Serving as First Search Unit)]

Next, the process executed by the transformational-question base search unit (serving as the first search unit) 203 will be discussed. As described above, the transformational-question base search unit (serving as the first search unit) 203 searches for text on WWW with using (transformational question pattern 1) generated by the similar-question generation unit 202. If matched text exists, the transformational-question base search unit (serving as the first search unit) 203 outputs the character string corresponding to [*3] in (transformational question pattern 1) as an answer to the client through the answer output unit 206, and terminates the process.

(Transformational question pattern 1) is
"The highest mountain in Okinawa is [*3]."

and the character string corresponding to [*3] in (transformational question pattern 1) is the character string located at the position where the word corresponding to the answer to the input question is set, namely, the character string in the constructive part of he answer equivalent word. Therefore, the character string corresponding to [*3] in (transformational question pattern 1) is output to the client through the answer output unit 206 as the answer to the (input question) as it is, and the process is terminated.

If matched text does not exist as a result of searching for text on WWW with using (transformational question pattern 1) generated by the similar-question generation unit 202, the transformational-question base search unit (serving as the first search unit) 203 searches for text on WWW with (transformational question pattern 2a to) generated by the similar-question generation unit 202, for example, makes a search based on text matching. If matched text exists, the character strings corresponding to [*1'] and [*3] in (transformational question pattern 2) are extracted and are adopted as extension words. That is, the character strings corresponding to the proper noun [*1'], which is the feature word, and a constructive part [*3] of the answer equivalent word are selected as extension words.

For example, assuming that text such as
"The highest mountain in Kumamoto is Mt. Kunimidake"
"The highest mountain in Hokkaido is Mt. Taisetsusan" is
acquired from the Web page text as the search result of the search process, which uses (transformational question pattern 2) and is executed by the transformational-question base search unit (serving as the first search unit) 203. In the two search results, the character strings corresponding to the proper noun [*1'], which is the feature word, are "Kumamoto" and "Hokkaido". Also, the character strings corresponding to the constructive part [*3] of the answer equivalent word are "Mt. Kunimidake" and "Mt. Taisetsusan."

Consequently, the four words of "Kumamoto," "Hokkaido," "Mt. Kunimidake," and "Mt. Taisetsusan" are selected as the extension words.

The transformational-question base search unit (serving as the first search unit) 203 makes a search in sequence with using (transformational question patterns 2-1 to 2-n) obtained by performing the transformational-question-pattern generation process of the similar-question generation unit 202. The transformational-question base search unit 203 searches the Web pages provided by the Web-page providing server connected to the network. When the search results the number of which is equal to or larger than a predetermined threshold value (T) are obtained, generating new (transformational question pattern 2n) and searching for an extension word are terminated.

For example, assuming that threshold value (T)=10, if 10 search results are obtained by searching with (transformational question pattern 2-1) to (transformational question pattern 2-30), generating new (transformational question pattern 2-31) and searching with the new transformational question patterns 2 are stopped. Then, a transition is made to an extension-word base search process.

[Extension-word Base Search Unit]

The extension-word base search unit 204 makes a search based on (x) the feature word (proper noun) [*1'] included in the input question presented by the client and (y) the extension words extracted from the results of the search made with the transformational question pattern 2 by the transformational-question base search unit 203, that is, the extension words made up of the character strings, which correspond to:
(y1) the proper noun [*1'], which is the feature words; and
(y2) the constructive part [*3] of the answer equivalent word in the transformational question pattern 2, and are included in the results of the search made with the transformational question pattern 2.

That is, the extension-word base search unit 204 concatenates the character strings corresponding to: the feature word (proper noun) [*1'] included in the input question; the proper noun [*1'] included in the results of the search made with the transformational question pattern 2; and the constructive part [*3] of the answer equivalent word with AND to generate a search expression, and then makes a search. The extension-word base search unit 204 searches the Web pages provided by the Web-page providing server connected to the network, for example, searches with keyword.

In the embodiment, the feature word (proper noun) [*1'] included in the input question is "Okinawa" and the extension words extracted from the result of the search made with transformational question pattern 2 by the transformational-question base search unit (serving as the first search unit) 203 are four words of "Kumamoto," "Mt. Kunimidake," "Hokkaido," and "Mt. Taisetsusan". The extension-word base search unit 204 sets "Okinawa AND Kumamoto AND Mt. Kunimidake AND Hokkaido AND Mt. Taisetsusan" as a search expression to execute a search process.

As the result of this search process, a Web page having a list of the highest mountains in the respective prefectures, for example, as shown in FIG. 3 is retrieved.

[Answer Selection Unit]

The answer selection unit 205 acquires an answer to the input question, with using the extension words and the Web page acquired as the result of the search made by the extension-word base search unit 204. FIG. 4 shows the HTML expression (excerpt) of the Web page shown in FIG. 3.

The answer selection unit 205 analyzes the correspondence relation between the proper noun [*1'], which is the feature word included in the Web page, and the constructive part [*3] of the answer equivalent word on the basis of the Web page acquired as the result of the search made by the extension-word base search unit 204 or the HTML format data of the Web page.

In the example shown in FIGS. 3 and 4, the relation between "Kumamoto" and "Mt. Kunimidake", and the relation between "Hokkaido" and "Mt. Taisetsusan" are analyzed as the relation between the extension words corresponding to the character strings corresponding to: the proper noun [*1'], which is the feature word included in the result of the search made with the transformational question pattern 2; and the constructive part [*3] of the answer equivalent word included in the transformation question pattern 2.

It is considered that the relation between the proper noun [*1'], which is the feature word, and the constructive part [*3] of the answer equivalent word is equivalent to the relation between "Okinawa" in the input question ([*1], feature word) and the answer to the input question.

There is a high possibility that the appearance construction of words and tags in the HTML format data indicating the structure of text, a table, a list etc., included in the Web page acquired as the result of the search made by the extension-word base search unit 204, namely, in the example, the structure between "Kumamoto" and "Mt. Kunimidake" and the structure between "Hokkaido" and "Mt. Taisetsusan" may be similar to the structure between "Okinawa" and "answer."

The answer selection unit 205 uses the relation to extract an answer. In the example, the character strings existing between "Kumamoto" and "Mt. Kunimidake" or those between "Hokkaido" and "Mt. Taisetsusan," namely, </TD><TD> is acquired from the HTML expression shown in FIG. 4. Then, a word having a character string similar to (or identical with) </TD><TD> between "Okinawa" and the word is adopted as the answer. In the HTML document shown in FIG. 4, "Mt. Omotodake" meets this condition, and therefore is output as the answer.

That is, the HTML format data in FIG. 4 contains constructive data of

Kumamoto </TD><TD> Mt. Kunimidake

Hokkaido </TD><TD> Mt. Taisetsusan, and expression data of

"Okinawa"</TD><TD>"Mt. Omotodake"

The relation between "Okinawa" in the input question ([*1], feature word) and the answer corresponding to the relation between the proper noun [*1'] in transformational question pattern 2 and the constructive part [*3] of the answer equivalent word corresponds to the data of "Okinawa"</TD><TD>"Mt. Omotodake", and "Mt. Omotodake" is determined as the character string corresponding to the answer.

Using the HTML data shown in FIG. 4, process of comparing only data existing between the proper noun [*1'] in transformational question pattern 2 and the constructive part [*3] of the answer equivalent word to detect an answer is executed in this example. However, not only the process of comparing data between the proper noun [*1'] in transformational question pattern 2 and the constructive part [*3] of the answer equivalent word is executed, but also process of comparing adjacent data may be performed. Not only the comparing based on the HTML data, but also comparing/extracting based on the constructive data of a list, a table, etc., or comparing/extracting based on text data may be executed.

[Answer Output Unit]

The answer output unit 206 outputs the answer provided by the question answering system to the client. The answer obtained from the result of the extension-word base search made by the answer selection unit 205 is output to the client is output to the client. If an answer is obtained from the result of the search made with transformational question pattern 1 by the transformational-question base search unit 203, such answer is output to the client.

Figure 5:
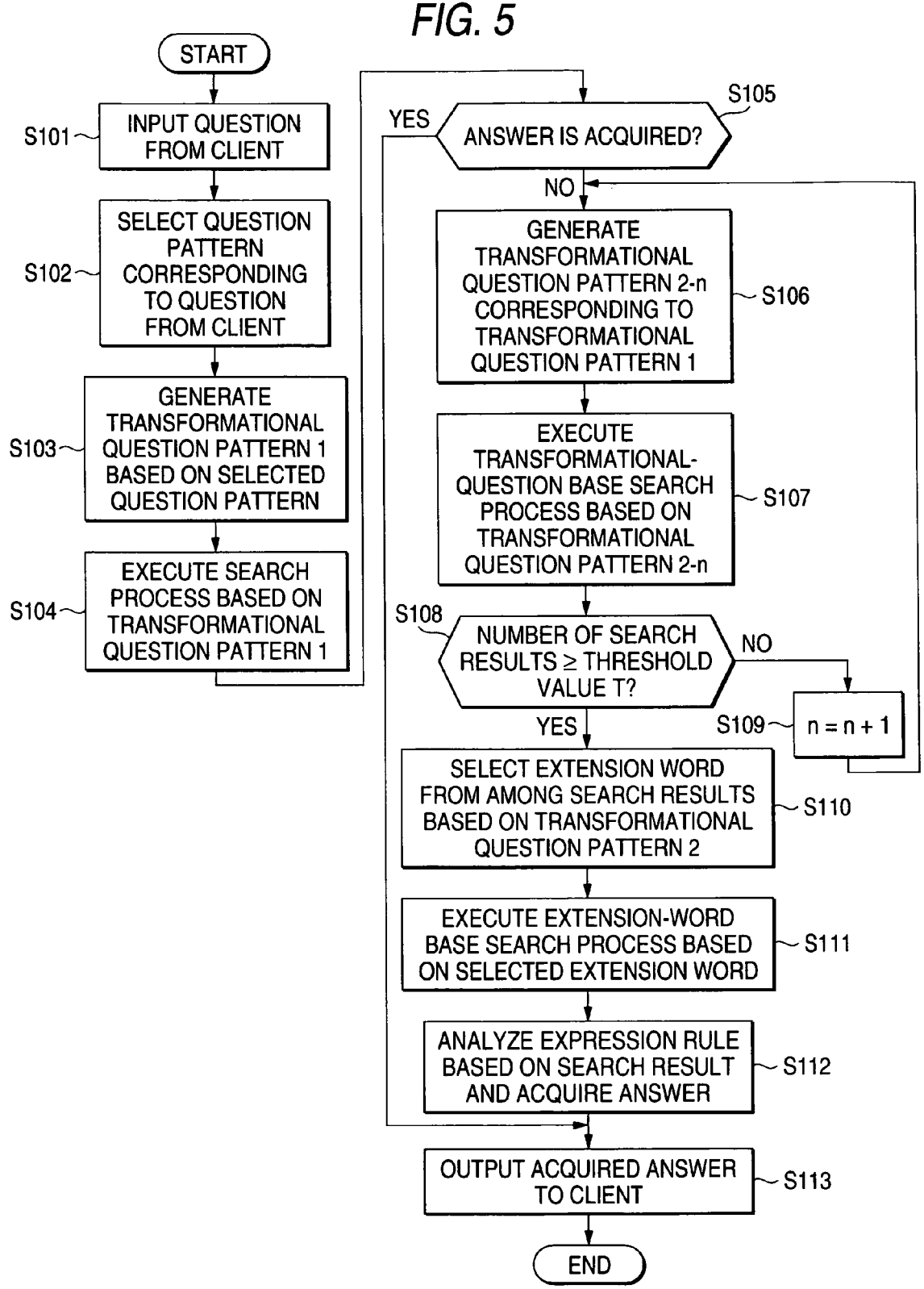
FIG. 5 is a flowchart to describe the process sequence of the question answering system according to the embodiment of the invention.

Next, the process sequence executed by the question answering system of this embodiment will be described with reference to a flowchart of FIG. 5.

When a question from a client is input at step S101, a question pattern corresponding to the input question from the client is selected at step S102. The similar-question generation unit 202 shown in FIG. 2 executes this process (step 102) based on a comparison between the (input question) from the client and a plurality of question patterns stored in the question-pattern storage unit 211.

Specifically, for example, if (input question) is "What is the highest mountain in Okinawa?", (Question pattern 1) "{Where|When|What|How much} is [*2] in [*1]?" is selected.

Next, transformational question pattern 1 corresponding to the selected question pattern is generated at step S103. In this process, the similar-question generation unit 202 shown in FIG. 2 extracts a transformational question pattern stored in the transformational-question-pattern storage unit 213, based on the input question and the question pattern corresponding to the input question.

Specifically, the similar-question generation unit 202 generates (Transformational question pattern 1) "The highest mountain in Okinawa is [*3]." as transformational question pattern 1 corresponding to (input question) is "What is the highest mountain in Okinawa?"

Next, a search process is executed based on the generated transformational question pattern 1, at step S104. The transformational-question base search unit 203 shown in FIG. 2 executes this process. That is, the transformational-question base search unit (serving as the first search unit) 203 makes a search with using (transformational question pattern 1) obtained by performing the transformational-question-pattern generation process at step S103. For example, the transformational-question base search unit 203 searches the Web pages provided by the Web-page providing server connected to the network; for example, executes a search process based on text matching.

The transformational-question base search unit (serving as the first search unit) 203 searches for text on WWW, with using (transformational question pattern 1) generated by the similar-question generation unit 202. If matched text exists and an answer can be acquired at step S105, the process goes to step S113 and the acquired answer is output to the client through the answer output unit 206.

That is, the character string corresponding to [*3] in (transformational question pattern 1) is employed as the answer and is output to the client through the answer output unit 206, and the process is terminated. If (transformational question pattern 1) is "The highest mountain in Okinawa is [*3]", the character string corresponding to [*3] in (transformational question pattern 1) is the character string located at a position where the word corresponding to the answer to the input question is set, namely, the character string in the constructive part of the answer equivalent word. Therefore, the character string corresponding to [*3] in (transformational question pattern 1) is output to the client through the answer output unit 206, and the process is terminated.

If matched text does not exist and an answer cannot be acquired in the search made with (transformational question pattern 1) at step S105, the process goes to step S106.

At step S106, (transformational question pattern 2-1) corresponding to (transformational question pattern 1) is generated. This process is performed in accordance with the following procedure:

First, the similar-question generation unit 202 extracts proper noun [*1'] in the same group as the constructive word in the (input question) corresponding to the word [*1'] selected as the proper noun (feature word) in (question pattern 1) from the proper-noun group information storage unit 212. For example, proper noun [*1'] in the same group as "Okinawa" is "Kumamoto," "Tokyo," "Hokkaido," etc.

Next, the similar-question generation unit 202 replaces the proper noun (feature word) in (transformational question pattern 1) previously generated with the proper noun [*1'] belonging to the same group to generate (transformational question pattern 2). (Transformational question pattern 2) generated by the similar-question generation unit 202 is the following question:

(Transformational Question Pattern 2-1)
"The highest mountain in Kumamoto is [*3]."

At step S107, the transformational-question base search unit (serving as the first search unit) 203 makes a search based on (transformational question pattern 2) generated at step S106. For example, the transformational-question base search unit 203 searches the Web pages provided by the Web-page providing server connected to the network; for example, executes a search process based on text matching. At step S108, a loop of step S109->S106->S107->S108 is made until results the number of which is equal or larger than the predetermined threshold value (T) are obtained. That is, different (transformational question patterns 2-2 to 2-n) are generated and the search process is executed. For example, (transformational question pattern 2-n) such as (Transformational Question Pattern 2-2)
"The highest mountain in Tokyo is [*3]"
(Transformational Question Pattern 2-3)
"The highest mountain in Hokkaido is [*3]" is generated and the search process is executed.

If it is determined at step S108 that the results the number of which is equal to or larger than the threshold value (T) are obtained, the process goes to step S110. At step S110, an extension word is selected from among the results of the search made with (transformational question pattern 2) by the transformational-question base search unit (serving as the first search unit) 203. Then, a search process is executed based on the selected extension word at step S111.

Specifically, assuming that text such as
"The highest mountain in Kumamoto is Mt. Kunimidake"
"The highest mountain in Hokkaido is Mt. Taisetsusan" is acquired as the result of the search made with (transformational question pattern 2). In the two search results, the character strings corresponding to the proper noun [*1'] as the feature word are "Kumamoto" and "Hokkaido" and the character strings corresponding to the constructive part [*3] of the answer equivalent word are "Mt. Kunimidake" and "Mt. Taisetsusan". Thus, the four words of "Kumamoto," "Hokkaido," "Mt. Kunimidake," and "Mt. Taisetsusan" are selected as the extension words. The four words are concatenated as well as the feature word (proper noun) [*1] included in the input question presented by the client, in this example, "Okinawa". Then, a search process in which "Okinawa AND Kumamoto AND Mt. Kunimidake AND Hokkaido AND Mt. Taisetsusan"

is set as a search expression is executed.

At step S112, an expression rule is found from the results of the extension-word base search executed at step S111, and an answer is obtained based on the expression rule. The answer selection unit 205 executes this process. In the example previously described, based on the HTML data of the Web page obtained as the search result, the relation between the extension words made up of the character strings, which correspond to: the proper noun [*1'], which is the feature word; and the constructive part [*3] of the answer equivalent word and are included in the result of the search made with transformational question pattern 2, is found as the expression rule. The expression rule is associated with the relation between "Okinawa" in the input question ([*1], feature word) and the answer, and "Mt. Omotodake" is acquired as the answer.

At step S113, the answer found at step S112 is output to the client through the answer output unit 206. As the result of the process, the answer "Mt. Omotodake" to (input question) "What is the highest mountain in Okinawa?" is presented to the client.

Other Embodiments

Examples different from the above-described embodiment will be discussed.

[a] Modification Example of Proper-noun Group Information Storage Unit 212 and Similar-question Generation Unit 202

In the above-described embodiment, the proper-noun group information storage unit 212 shown in FIG. 2 has a dictionary in which proper nouns are grouped. For example, the proper-noun group information storage unit 212 outputs "Kumamoto," "Hokkaido," etc. as the noun in the group corresponding to "Okinawa." However, the similar-question generation unit 202 may sequentially generate the same-group nouns corresponding to the proper noun (feature word) included in the input question without storing data in the proper-noun group information storage unit 212.

For example, the similar-question generation unit 202 may sequentially generate the same-group nouns corresponding to the proper noun (feature word) included in the input question based on a rule such that "character string up to space"+"character string made up of arbitrary alphanumeric characters or hyphens" is assumed to be the same-group noun for "character string made up of alphabetic characters or hyphens"+"space"+"character string made up of alphanumeric characters or hyphens".

Specifically, for example, for "FUJI PCV-HX22B7," "FUJI *" (where a character string made up of arbitrary alphanumeric characters or hyphens is entered in "*") is assumed to be the same-group noun.

If the input question from a client is "When {is|was} the on-sale date of FUJI PCV-HX22B7?", the transformational-question base search unit 203 searches for extension words by searching transformational question pattern 2 such as "The on-sale date of [FUJI] {is|was} [3]". If "The on-sale date of FUJI VGO-HX52B7 is Dec. 4, 2004" and "The on-sale date of FUJI PCV-RZ62 is Jun. 10, 2003" are found in text on WWW, "FUJI VGO-HX52B7," "Dec. 4, 2004," "FUJI PCV-RZ62," and "Jun. 10, 2003" can be obtained as extension words and there is a high possibility that a list of the release dates for respective models beginning with FUJI can be retrieved.

Further, focusing attention on a suffix as well as alphanumeric characters. For example, if the feature word of the input question is "San Jose airport," the same-group noun corresponding to "San Jose airport" can be defined as "arbitrary proper noun"+("international")+"airport"

According to this rule, for example,

Haneda airport

Kennedy international airport and the like are nouns corresponding to the same-group noun corresponding to "San Jose airport." It is not necessary to exhaustively generate the same-group noun. The function of the embodiment of the invention can be provided so long as several extension words can be obtained.

The same-group noun collection rule can also be used to automatically create a same-group noun dictionary from a (Web) text set. For example, when the same-group noun collection rule

[**] {such as|for example}+repeating "[*]" one or more time+{and|or}+[*] . . .

is applied, a dictionary made up of a set of the same-group nouns can be created.

Specifically, for example, if text on a Web page contains
"US airplanes such as F2A Buffalo, F6F Hellcat 5 and F8F Bear-cat . . . ", this text is text corresponding to [**] {such as|for example}+repeating "[*]" one or more time+{and|or}+[*] . . . . From this text, it can be determined that "F2A Buffalo," "F6F Hellcat 5," and "F8F Bear-cat" are the nouns belonging to the same group as "US airplanes."

In the example, a group noun corresponding to a proper noun not stored in the proper-noun group information storage unit 212 in advance can be acquired.

[b] Modification Example of Transformational-question Base Search Unit 203

In the description of the embodiment, the transformational-question base search unit 203 makes the searches with transformational question pattern 1 and transformational question pattern 2. For example, various transformational question patterns such as (Transformational Question Pattern 1)

"The highest mountain in Okinawa is [*3]", and (Transformational question pattern 2-1)

"The highest mountain in Kumamoto is [*3]"

are generated in response to (input question) "What is the highest mountain in Okinawa?", and then the searches are made.

Such transformation process is not necessarily indispensable. A search with input of a question, such as "what is the highest mountain in Kumamoto?";

"what is the highest mountain in Tokyo?"; and

"what is the highest mountain in Hokkaido?", generated by simply replacing the feature word with a noun belonging to the same group as the feature word so as to correspond to (input question) "What is the highest mountain in Okinawa?", may be executed according to a similar process to a process to which the question answering system disclosed in JP 2002-132811 A is applied, to acquire extension words.

Since a certainty value is usually assigned to an answer candidate in the question answering system, it is possible to select an extension word precisely by adopting an answer candidate having the certainty value equal to or larger than a given threshold value as an extension word.

According to the example, an extension word can be retrieved without providing any transformational pattern for each question pattern.

[c] Use Example of Syntactic and Semantic Analysis Unit

A syntactic and semantic analysis unit may be added to the above-described embodiment. In this case, it is made possible for a single question pattern to cover a plurality of question representations, and the steps for generating a question pattern can be decreased.

As a configuration having the syntactic and semantic analysis unit for performing syntactic and semantic analysis process, the question-pattern storage unit 211 stores question patterns to be applied to the syntactic and semantic analysis result as well as surface character strings.

Natural languages described in various languages including Japanese and English essentially have abstract and highly ambiguous nature, but can be subjected to computer process as sentences are handled mathematically. Consequently, various applications and services concerning natural languages can be provided by automation process, such as machine translation, an interactive system, a search system, and a question answering system. The natural language process generally is divided into process phases of morphological analysis, syntactic analysis, semantic analysis, and context analysis.

In the morphological analysis, a sentence is divided into morphemes of minimal meaning units and a process of identifying part of speech is performed. In the syntactic analysis, a sentence structure such as a phrase structure is analyzed based on the grammar laws. Since the grammar laws are of a tree structure, the syntactic analysis result generally becomes a tree structure where the morphemes are joined based on the modification relation. In the semantic analysis, obtained is a semantic structure representing the meaning of a sentence on the basis of the meaning of the words in the sentence (notion), the semantic relation between the words, etc, to synthesize a semantic structure. In the context analysis, text of a series of sentences (discourse) is assumed to be the basic unit of analysis, the semantic (meaningful) unit between the sentences is obtained, and a discourse structure is formed.

It is said that the syntactic analysis and the semantic analysis are absolutely necessary arts to realize applications of an interactive system, machine translation, document proofreading support, document abstract, etc., in the field of natural language process.

In the syntactic analysis, a natural language sentence is received and a process of determining the modification relation between the words (segments) is performed based on the grammar laws. The syntactic analysis result can be represented in the form of a true structure called dependency structure (dependency tree). In the semantic analysis, a process of determining the case relation in a sentence can be performed based on the modification relation between the words (segments). The expression "case relation" mentioned here refers to the grammar role such as subject (SUBJ) or object (OBJ) that each of the elements making up a sentence has. The semantic analysis may contain a process of determining the sentence tense, aspect, narration, etc.

As an example of a syntactic and semantic analysis system, it is possible to apply a natural language process system based on LFG described in detail in "Constructing a practical Japanese Parser based on Lexical Functional Grammar" (Masuichi and Ohkuma, natural language processing, Vol. 10. No. 2, pp. 79-109 (2003)).

Figure 6:
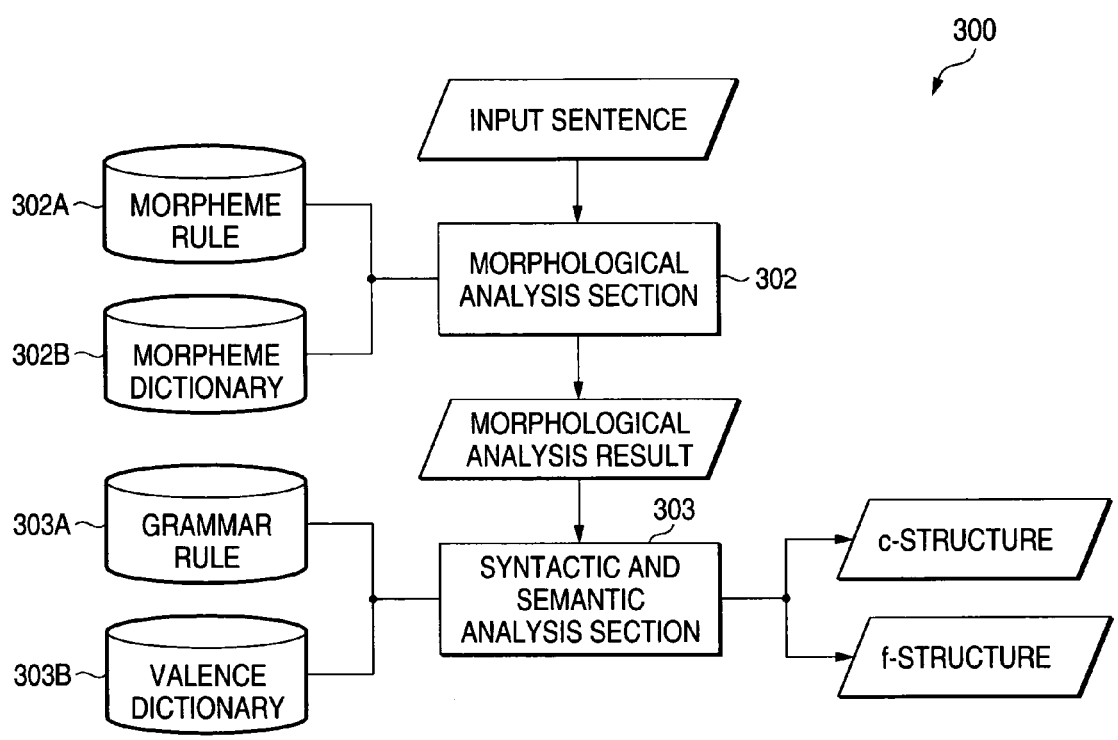
FIG. 6 is a diagram to describe a configuration example of a syntactic and semantic analysis system.

FIG. 6 shows the configuration of a natural language process system 300 based on Lexical Functional Grammar (LFG) A morphological analysis section 302 has a morpheme rule 302A and a morpheme dictionary 302B relating to a specific language such as Japanese. The morphological analysis section 302 divides an input sentence into morphemes of minimal meaning units and performs the process of identifying part of speech.

Then, the morphological analysis result is input to a syntactic and semantic analysis section 303. The syntactic and semantic analysis section 303 has dictionaries such as a grammar rule 303A and a valence dictionary 303B. The syntactic and semantic analysis section 303 analyzes the phrase structure based on the grammar rule, etc., and analyzes the semantic structure representing the meaning of a sentence based on the meaning of the words in the sentence, the semantic relation between the words, etc., (the valence dictionary describes the relation with any other component in the sentence such as a verb and a subject, and the semantic relation between a predicate and its dependent word can be extracted). Then, the syntactic and semantic analysis section 303 outputs "c-structure (constituent structure)" representing the phrase structure of the sentence made up of words, morphemes, etc., as a tree structure as the syntactic analysis result. Also, the syntactic and semantic analysis section 303 outputs "f-structure (functional structure)" as a result of semantically and functionally analyzing the input sentence as an interrogative sentence, past form, a polite sentence, etc., based on the case structure of a subject, an object, etc.

That is, c-structure represents the structure of a natural language sentence as a tree structure by collecting the morphemes of the sentence into an upper phrase, and f-structure represents semantic information of the case structure, sentence tense, aspect, narration, etc., of a sentence as an attribute-attribute value matrix structure based on the notion of the grammar function.

However, if the syntactic and semantic analysis process is performed, the need for providing all question patterns is eliminated. That is, all question patterns mentioned above have the common analysis result shown in FIG. 7. FIG. 7A shows data indicating modifiers, modifiees, and modification relations. The results of the syntactic and semantic analysis for the various question sentences mentioned above all become the analysis result in FIG. 7A and are common.

Figure 8:
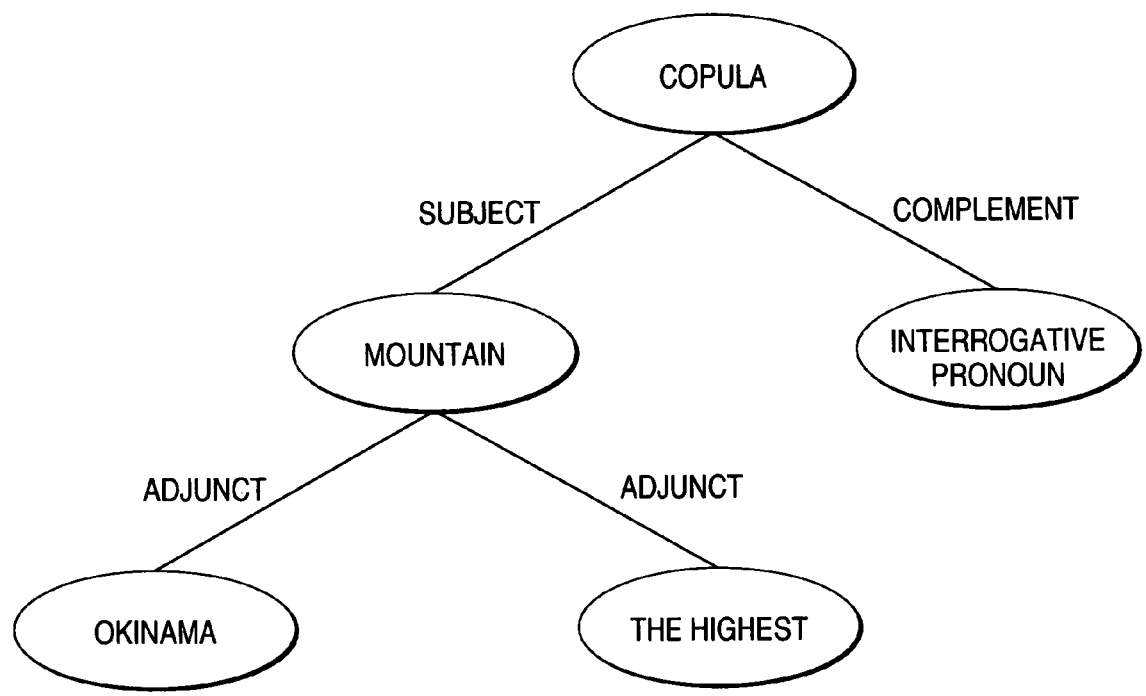
FIG. 8 is a drawing to describe a construction example of c-structure as the syntactic and semantic analysis result.

If the syntactic and semantic analysis process result shown in FIG. 7A is represented by a tree structure as above-described c-structure, it becomes a structure shown in FIG. 8.

The analysis result is as follows:

The modifier "Okinawa" involves the modifiee "mountain" and the modification relation therebetween is ADJUNCT;

The modifier "the highest" involves the modifiee "mountain" and the modification relation therebetween is ADJUNCT;

The modifier "mountain" involves the modifiee 'copula' and the modification relation therebetween is SUBJECT;

The modifier 'interrogative pronoun' involves the modifiee 'copula' and the modification relation therebetween is COMPLEMENT.

According to the construction, the result common to all the question sentences described above is produced. A question pattern conforming to the syntactic and semantic analysis result shown in FIG. 7B is set as a question pattern for the syntactic and semantic analysis result based on the syntactic and semantic analysis result shown in FIG. 7A common to all question sentences. Then, the transformational-question base search unit 203 executes a search. In this case, the search is made by checking matching with the syntactic and semantic analysis result corresponding to the description of a Web page. In the question pattern conforming to the syntactic and semantic analysis result in FIG. 7B, [*2] is element linking all arbitrary modification portions excluding [*1].

As in the process example, the syntactic and semantic analysis result is generated from a question sentence and a search is made, whereby it is made possible for a single question pattern to cover a plurality of question representations and the steps for generating question patterns can be decreased.

[d] Modified Example 1 of Search Units

In the description of the embodiment, the transformational-question base search unit (serving as the first search unit) 203 and the extension-word base search unit 204 make a search using each Web page as search target data. The unit of the search target may be directory units rather than Web page units. For example, if a Web page describing information relating to each country is placed in one directory on a country-by-country basis, a search is made by assuming that the whole directory is one Web page.

By executing this search process, for example, if information relating to a question pattern and an answer is not exhaustively described in a single Web page and is recorded across a plurality of Web pages, it is made possible to acquire data across the pages and the search hit rate can be raised.

[e] Modified Example 2 of Search Units

In the description of the embodiment, the extension-word base search unit 204 simply executes a search based on a search expression in which the acquired extension words are concatenated with AND by way of example.

That is, for example, the extension-word base search unit 204 executes a search process with setting "Okinawa AND Kumamoto AND Mt. Kunimidake AND Hokkaido AND Mt. Taisetsusan"

as a search expression.

To acquire an answer furthermore effectively in the extension-word base search process, a search is made using the relation between the extension words. For example, in the example described above, a search is made giving a high priority to a Web page or a directory in which the relation between Kumamoto and Mt. Kunimidake and the relation between Hokkaido and Mt. Taisetsusan are similar. When such a search is executed, it is made possible to search a Web page (directory) exhaustively containing a typical question pattern and an answer thereto for the typical question pattern and the answer thereto with high accuracy.

Lastly, a hardware configuration example of an information process apparatus implementing the question answering system for executing the process described above will be discussed with reference to FIG. 9. A CPU (Central Processing Unit) 501 executes a process corresponding to an OS (Operating System) and executes selection of the corresponding question pattern, generation of a transformational question pattern, a search with the transformational question pattern, an extension word search, extension-word base search process, answer selection process, etc., based on an input question described above in the embodiment. The CPU 501 executes the process in accordance with a computer program stored in a data storage section of ROM, a hard disk, etc., of each information process apparatus.

ROM (Read-Only Memory) 502 stores the program, operation parameters, etc., used by the CPU 501. RAM (Random Access Memory) 503 stores a program used in execution of the CPU 501, parameters, etc., changed whenever necessary in the execution of the CPU 501. They are connected by a host bus 504 implemented as a CPU bus, etc.

The host bus 504 is connected to an external bus 506 of a PCI (Peripheral Component Interconnect/Interface) bus, etc., via a bridge 505.

A keyboard 508 and a pointing device 509 are input devices operated by the user. A display 510 is implemented as a liquid crystal display, a CRT (cathode ray tube), or the like for displaying various pieces of information as text or an image.

An HDD (Hard Disk Drive) 511 contains a hard disk and drives the hard disk for recording or reproducing (playing back) a program executed by the CPU 501 and information. The hard disk is used as the question-pattern storage unit, the proper-noun group information storage unit, and the transformational-question-pattern storage unit previously described with reference to FIG. 2 and further stores various computer programs such as a data process program.

A drive 512 reads data or a program recorded on a removable record medium 521 such as a magnetic disk, an optical disk, a magneto-optical disk, or semiconductor memory mounted, and supplies the data or the program to the RAM 503 connected via the interface 507, the external bus 506, the bridge 505, and the host bus 504.

A connection port 514 is a port for connecting an external connection machine 522 and has a connection section of USB, IEEE 1394, etc. The connection port 514 is connected to the CPU 501, etc., via the interface 507, the external bus 506, the bridge 505, the host bus 504, etc. A communication section 515 is connected to a network for executing communications with a client and a network connection server.

Figure 9:
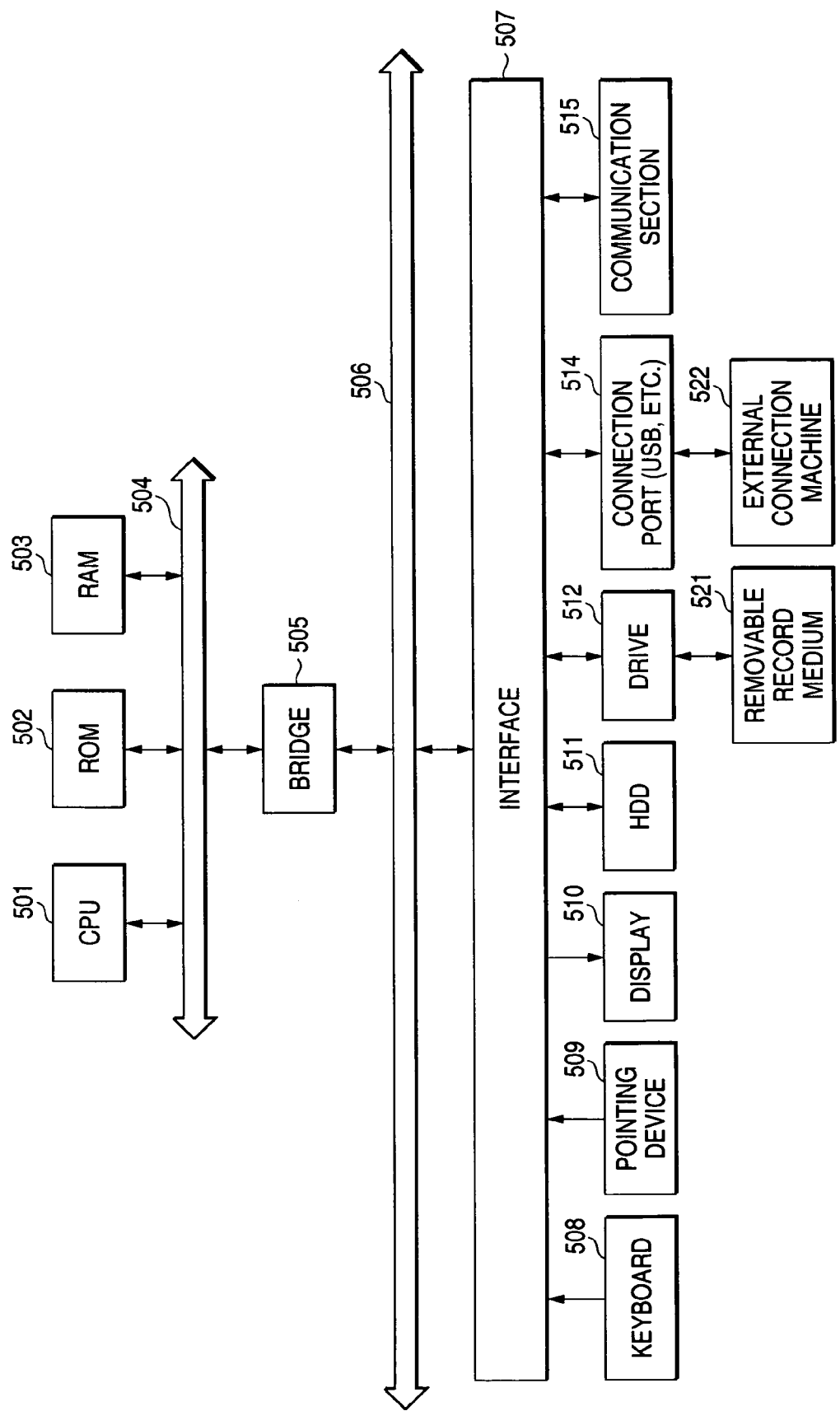
FIG. 9 is a diagram to describe a hardware configuration example of the question answering system according to the embodiment of the invention.

The hardware configuration example of the information process apparatus applied as the question answering system shown in FIG. 9 is an example of an apparatus incorporating a PC and the question answering system of the invention is not limited to the configuration shown in FIG. 9 and may have any configuration if the configuration has the capability of executing the process described above in the embodiment.

While the invention has been described in detail with reference to the specific embodiments, it is to be understood that modifications will be apparent to those skilled in the art without departing from the spirit and the scope of the invention. That is, the above embodiments are described for illustrative purposes only and it is to be understood that the invention is not limited to the specific embodiments thereof. In order to determine the scope of the invention, claims should be referred.

The process sequence described in the specification can be executed by both or either of hardware and software. To execute software process, the program recording the process sequence can be installed in memory in a computer incorporated in dedicated hardware for execution or can be installed in a general-purpose computer that can execute various types of process for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of process described in the specification may be executed not only in time sequence according to the description, but also in parallel or individually in response to the process capability of the apparatus for executing the processor as required. The system in the specification is a logical set made up of a plurality of units (apparatus) and is not limited to a set of units (apparatus) housed in a single cabinet.

As described above, the configuration of the embodiments of the invention selects a feature word from an input question; generates a transformational question in which the feature word is replaced with another word; executes a first search process based on the transformational question generated; selects a word included in a first search result acquired by executing the first search process as an extension word; executes a second search process with using the selected extension word; analyzes a correspondence relation among extension words included in a second search result acquired by executing the second search process; determines the feature word and a constructive part of an answer equivalent word in the second search result based on an analysis result; and selects a word determined to be an answer. Thus, if an answer to the input question cannot be detected in the search process, it is made possible to acquire an answer to the question at a high probability according to a question based on a similar question.

What is claimed is:

1. A question answering system comprising:
   a similar-question generation unit that selects a feature word from an input question to generate a transformational question in which the feature word is replaced with another word;
   a first search unit that executes a first search process based on the transformational question generated by the similar-question generation unit;
   a second search unit that selects a word included in a first search result acquired by executing the first search process as an extension word and executes a second search process with using the selected extension word; and
   an answer selection unit that analyzes a correspondence relation among extension words included in a second search result acquired by executing the second search process, determines the feature word and a constructive part of an answer equivalent word in the second search result based on an analysis result, and selects for display a word determined to be an answer; and
   a display unit that displays the selected word.

2. The question answering system according to claim 1, wherein the answer selection unit analyzes the correspondence relation among the extension words based on HTML format data, which is acquired as the second search result acquired, determines the feature word and the constructive part of the answer equivalent word in the second search result based on the analysis result, and selects the word determined to be the answer.

3. The question answering system according to claim 1 wherein:
   the similar-question generation unit generates a transformational question pattern 1, which is a similar question to the input question, without changing the feature word making up the input question,
   the first search unit executes a search process based on the transformational question pattern 1, and
   if no answer is acquired as a result of the search process based on the transformational question pattern 1,
   the similar-question generation unit generates as the transformational question a transformational question pattern 2 in which the feature word making up the input question is replaced with a same-group word belonging to the same group in a thesaurus as the feature word;

the first search unit executes the first search process based on the transformational question pattern 2; and the second search unit selects the word included in the first search result acquired by executing the first search process as the extension word and executes the second search process with using the selected extension word.

4. The question answering system according to claim 1, wherein:

the second search unit selects (a) a same-group word, which is selected from words included in the first search result and belongs to the same group as the feature word, and (b) an answer equivalent word in the transformational question as the extension words, and the second search unit executes the second search process with using the selected extension words.

5. The question answering system according to claim 1, further comprising:

a first storage unit that stores question patterns; and a second storage unit that stores transformational patterns of the question patterns stored in the first storage unit, wherein:

the similar-question generation unit compares the input question with the question patterns stored in the first storage unit to select a question pattern corresponding to the input question, and the similar-question generation unit generates the transformational question corresponding to the selected question pattern, based on the transformational patterns stored in the second storage unit.

6. The question answering system according to claim 1, further comprising:

a third storage unit that stores group classification information of feature words, which are acquired from input questions as proper nouns, wherein:

the similar-question generation unit generates the transformational question in which the feature word making up the input question with a same-group word belonging to the same group as the feature word, with using the classification information stored in the third storage unit.

7. The question answering system according to claim 1, wherein the similar-question generation unit generates the transformational question in which the feature word is replaced with the other word, based on a predetermined rule.

8. The question answering system according to claim 1 further comprising:

a syntactic and semantic analysis unit that executes syntactic and semantic analysis on the input question, wherein:

the similar-question generation unit generates a question pattern based on a analysis result acquired by executing the syntactic and semantic analysis, and the first search unit executes a search process based on the question pattern generated by the similar-question generation unit.

9. A data search method comprising:

selecting a feature word from an input question;

generating a transformational question in which the feature word is replaced with another word;

executing a first search process based on the transformational question generated;

selecting a word included in a first search result acquired by executing the first search process as an extension word;

executing a second search process with using the selected extension word;

analyzing a correspondence relation among extension words included in a second search result acquired by executing the second search process;

determining the feature word and a constructive part of an answer equivalent word in the second search result based on an analysis result;

selecting a word determined to be an answer; and displaying the selected word.

10. The data search method according to claim 9, wherein the analyzing comprises analyzing the correspondence relation among the extension words based on HTML format data, which is acquired as the second search result acquired.

11. The data search method according to claim 9, further comprising:

generating a transformational question pattern 1, which is a similar question to the input question, without changing the feature word making up the input question, executing a search process based on the transformational question pattern 1, and if no answer is acquired as a result of the search process based on the transformational question pattern 1, generating as the transformational question a transformational question pattern 2 in which the feature word making up the input question is replaced with a same-group word belonging to the same group as the feature word;

executing the first search process based on the transformational question pattern 2;

selecting the word included in the first search result acquired by executing the first search process as the extension word; and executing the second search process with using the selected extension word.

12. The data search method according to claim 9, wherein the selecting of the word included in the first search result as the extension word comprises selecting (a) a same-group word, which is selected from words included in the first search result and belongs to the same group as the feature word, and (b) an answer equivalent word in the transformational question as the extension words.

13. The data search method according to claim 9 wherein:

the generating of the transformational question comprises:

comparing the input question with question patterns stored in a first storage unit to select a question pattern corresponding to the input question, and generating the transformational question corresponding to the selected question pattern, based on transformational patterns stored in a second storage unit.

14. The data search method according to claim 9, wherein the generating of the transformational question comprises generating the transformation question in which the feature word making up the input question with a same-group word belonging to the same group as the feature word, with using classification information stored in a third storage unit.

15. The data search method according to claim 9, wherein the generating of the transformational question comprises generating the transformation question in which the feature word is replaced with the other word, based on a predetermined rule.

16. The data search method according to claim 9, further comprising:

executing syntactic and semantic analysis on the input question;

generating a question pattern based on a analysis result acquired by executing the syntactic and semantic analysis; and executing a search process based on the question pattern generated.

17. A computer program stored in a computer readable medium, the computer program causing a computer to execute a data search process comprising:

selecting a feature word from an input question;
generating a transformational question in which the feature word is replaced with another word;
executing a first search process based on the transformational question generated;
selecting a word included in a first search result acquired by executing the first search process as an extension word;
executing a second search process with using the selected extension word;
analyzing a correspondence relation among extension words included in a second search result acquired by executing the second search process;
determining the feature word and a constructive part of an answer equivalent word in the second search result based on an analysis result; and
selecting a word determined to be an answer.

* * * * *